US008542211B2

(12) United States Patent
Elias

(10) Patent No.: US 8,542,211 B2
(45) Date of Patent: Sep. 24, 2013

(54) PROJECTION SCAN MULTI-TOUCH SENSOR ARRAY

(75) Inventor: John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 1990 days.

(21) Appl. No.: 11/650,041

(22) Filed: Jan. 3, 2007

(65) Prior Publication Data

US 2008/0158198 A1 Jul. 3, 2008

(51) Int. Cl.
*G09G 5/00* (2006.01)

(52) U.S. Cl.
USPC ........ 345/174; 345/173; 345/178; 178/18.01; 178/18.06

(58) Field of Classification Search
USPC ............ 345/156, 173–179; 178/18.01–18.09
See application file for complete search history.

(56) References Cited

U.S. PATENT DOCUMENTS

| 5,483,261 | A | | 1/1996 | Yasutake |
| 5,488,204 | A | | 1/1996 | Mead et al. |
| 5,694,154 | A | * | 12/1997 | Knox et al. ................. 345/173 |
| 5,825,352 | A | | 10/1998 | Bisset et al. |
| 5,835,079 | A | | 11/1998 | Shieh |
| 5,880,411 | A | | 3/1999 | Gillespie et al. |
| 6,188,391 | B1 | | 2/2001 | Seely et al. |
| 6,246,385 | B1 | * | 6/2001 | Kinoshita et al. ............... 345/87 |
| 6,310,610 | B1 | | 10/2001 | Beaton et al. |
| 6,323,846 | B1 | | 11/2001 | Westerman et al. |
| 6,392,636 | B1 | * | 5/2002 | Ferrari et al. ................. 345/173 |
| 6,639,587 | B2 | * | 10/2003 | Carpenter et al. ............ 345/173 |
| 6,690,387 | B2 | | 2/2004 | Zimmerman et al. |
| 6,819,784 | B1 | * | 11/2004 | Sabatini et al. ............... 382/124 |
| 7,015,894 | B2 | | 3/2006 | Morohoshi |
| 7,184,064 | B2 | | 2/2007 | Zimmerman et al. |
| 7,298,875 | B2 | * | 11/2007 | Kim et al. ..................... 382/124 |
| 7,663,607 | B2 | | 2/2010 | Hotelling et al. |
| 2004/0104826 | A1 | * | 6/2004 | Philipp ........................... 341/34 |
| 2005/0110055 | A1 | * | 5/2005 | Thomas et al. ............... 257/272 |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kevin M Nguyen
*Assistant Examiner* — Jennifer Nguyen
(74) *Attorney, Agent, or Firm* — Morrison & Foerster LLP

(57) ABSTRACT

A touch sensor panel can be constructed on a single surface of a substrate. The panel can be formed as a plurality of distributed RC lines arranged in an array of rows and columns. Each distributed RC line can include alternating connected transistors and metal pads formed on a single surface of the substrate. During operation, the rows and columns are enabled at different times, and the pulse travel times for each row and column in both directions are measured. Equalized travel times are then computed as the sum of the pulse travel times in both directions, and indicate which rows and columns have a finger touching it. The un-equalized pulse travel time data can then be used to determine the relative positions of the fingers within the rows and columns and un-ambiguously determine the positions of all the finger contacts.

32 Claims, 8 Drawing Sheets

(56) References Cited

U.S. PATENT DOCUMENTS

| | | |
|---|---|---|
| 2005/0110766 A1* | 5/2005 | Kent et al. .................. 345/173 |
| 2006/0026521 A1 | 2/2006 | Hotelling et al. |
| 2006/0097991 A1 | 5/2006 | Hotelling et al. |
| 2006/0103633 A1* | 5/2006 | Gioeli .......................... 345/173 |
| 2006/0197753 A1 | 9/2006 | Hotelling |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PROJECTION SCAN MULTI-TOUCH SENSOR ARRAY

FIELD OF THE INVENTION

This invention relates to touch sensor panels, and more particularly, to multi-touch sensor panels whose elements can be applied to a single surface of a substrate.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens can include a touch panel, which can be a clear panel with a touch-sensitive surface. The touch panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

Touch panels can include an array of touch sensors capable of detecting touch events (the touching of fingers upon a touch-sensitive surface). Some current touch panels are able to detect multiple touches (the touching of fingers upon a touch-sensitive surface at distinct locations at about the same time) and near touches (fingers within the near-field detection capabilities of their touch sensors), and identify and track their locations. Examples of multi-touch sensor panels are described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

Capacitive touch sensor panels can be formed as an array of rows and columns of sensors on opposing sides of a touch substrate. For example, the rows can form drive electrodes on one surface of the touch substrate and the columns can form sense electrodes on the opposing surface. To scan a sensor panel, a stimulus can be applied to one row with all other rows held at DC voltage levels. When a row is stimulated, a modulated output signal can appear on the columns of the sensor panel. The columns can be connected to analog channels (also referred to herein as event detection and demodulation circuits). For every row that is stimulated, each analog channel connected to a column generates an output value representative of an amount of change in the modulated output signal due to a touch event occurring at the sensor located at the intersection of the stimulated row and the connected column. After analog channel output values are obtained for every column in the sensor panel, a new row is stimulated (with all other rows once again held at DC voltage levels), and additional analog channel output values are obtained. When all rows have been stimulated and analog channel output values have been obtained, the sensor panel is said to have been "scanned," and a complete "image" of touch can be obtained over the entire sensor panel. This image of touch can include an analog channel output value for every pixel (row and column) in the panel, each output value representative of the amount of touch that was detected at that particular location.

The manufacturing cost of a two-surface sensor panel as described above is generally higher than if only one surface of the substrate was needed for sensor circuitry. In addition, when the touch substrate overlays a display device (e.g., an LCD), circuitry on the second surface typically increases light loss as compared to a single surface system. Therefore, it is desirable for cost and performance reasons to realize a multi-touch sensor that only needs one surface of the touch substrate for sensor circuitry.

SUMMARY OF THE INVENTION

A multi-touch sensor panel can be constructed on a single surface of a touch substrate to reduce manufacturing costs and minimize light loss in transparent embodiments. The panel can be formed as a plurality of distributed RC lines arranged in an array of rows and columns. Each distributed RC line can include alternating connected transistors and metal pads formed on a single surface of a sensor panel substrate, with the drain and source terminals of the transistors connected to adjacent metal pads.

During operation, the rows and columns are enabled at different times, and the pulse travel times for each row and column in both directions are measured. Equalized travel times for each row and column are then computed as the sum of the pulse travel times in both directions. The equalized pulse travel times can be compared to an equalized no-touch pulse travel time to determine which rows and columns, if any, have a finger touching it. The equalized pulse travel times represent a map, albeit an ambiguous one, of all points touched by fingers. However, before an unambiguous map of finger contacts can be generated, more information needs to be applied. The reason for this is that the equalized pulse travel times, which provide high selectivity in determining whether a finger(s) is touching over a row or a column, only provide projection scan-like data that, by itself, cannot resolve rotational ambiguity of multiple finger contacts.

However, once the rows and columns containing finger contacts are known, the un-equalized left-to-right, right-to-left, top-to-bottom and bottom-to-top pulse travel time data can be used to determine the relative positions of the fingers within the rows and columns and un-ambiguously determine the positions of all the finger contacts. In particular, for each row indicating a possible contact, the pulse travel times for right-to-left and left-to-right are compared against other rows for which there were possible contacts, one by one, to establish the relative positions of the contacts across the rows. After all rows have been processed, the same process is then repeated for each column showing a possible contact. For each column indicating a possible contact, the pulse travel times for top-to-bottom and bottom-to-top are compared against other columns for which there were possible contacts, one by one, to establish the relative positions of the contacts across the columns.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

A multi-touch sensor panel can be constructed on a single surface of a touch substrate to reduce manufacturing costs and minimize light loss in transparent embodiments. The panel can be formed as a plurality of distributed RC lines arranged in an array of rows and columns. Each distributed RC line can include alternating connected transistors and metal pads formed on a single surface of a sensor panel substrate, with the drain and source terminals of the transistors connected to adjacent metal pads. The substrate can constructed from a variety of different materials including, but not limited to, metal, plastic, and glass. Because the single-surface elements of the sensor panel can be manufactured using a printing process (e.g., roll-to-roll or offset), manufacturing costs can be lower as compared to systems produced via a batch process. Transparent multi-touch substrates may also be suitable as an overlay on a display device such as an LCD display, and the presence of elements on only a single side of the substrate can result in less light loss.

Figure 1:
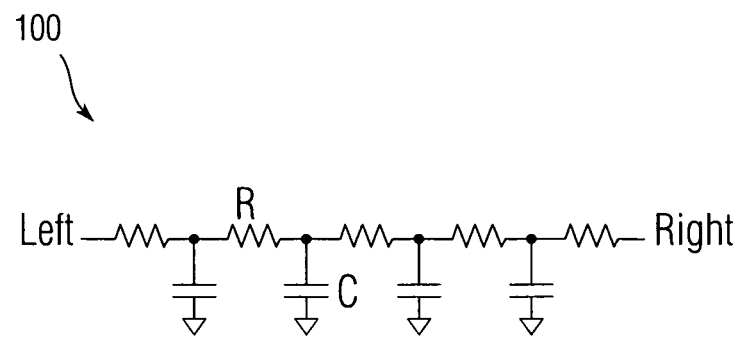
FIG. 1 illustrates an exemplary distributed resistor-capacitor (RC) line according to one embodiment of this invention.

FIG. 1 illustrates an exemplary distributed resistor-capacitor (RC) line 100. A distributed RC line 100 as shown in FIG. 1 delays the propagation of an electrical pulse by an amount that depends on the magnitude of the product RC, where R is the total resistance of all resistive elements and C is the total capacitance of all capacitive elements making up the distributed RC line. The magnitude of RC can be found by measuring the time it takes a pulse that enters the left (or the right side) to appear on the opposite side. Any change in the value of R or C (and thus the product of R and C), either globally or locally, alters the time it takes a pulse to travel from one end to the other of distributed RC line 100. Because a finger has an inherent capacitance that can change the overall capacitance of distributed RC line 100, such distributed RC lines can be the basis for a capacitive touch sensor.

Figure 2:
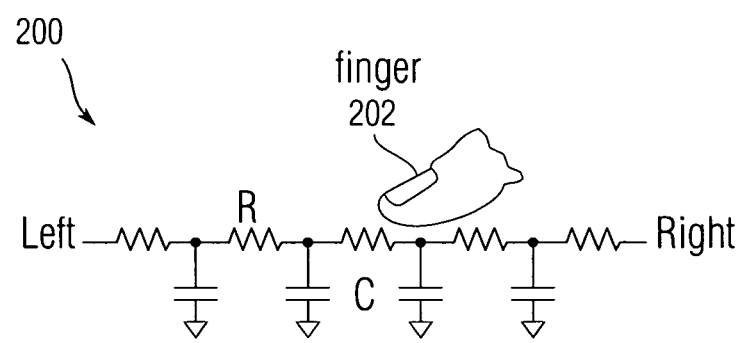
FIG. 2 illustrates how an exemplary distributed RC line can serve as a touch sensor according to one embodiment of this invention.

FIG. 2 illustrates how an exemplary distributed RC line 200 can serve as a touch sensor. It should first be understood that with reasonably constant values for R and C, the pulse travel time from one end of the line to the other is relatively constant. However, when a conducting object such as finger 202 approaches distributed RC line 200, the capacitance of the line near the finger changes. This causes the pulse travel time to change. While the location of finger 202 along distributed RC line 200 can be inferred by comparing the pulse travel time to a known pulse travel time profile, this methodology is impractical to implement because it would be difficult to create a pulse travel time profile for all possible values of finger capacitance. Furthermore, such a methodology could not identify the presence of a second finger along distributed RC line 200.

Figure 3:
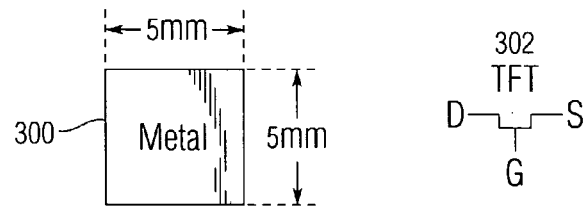
FIG. 3 illustrates an exemplary metal pad and thin film transistor (TFT), which are examples of the basic circuit elements needed to construct a distributed RC line according to one embodiment of this invention.

FIG. 3 illustrates an exemplary metal pad 300 and thin film transistor (TFT) 302, which are examples of the basic circuit elements sufficient to construct a distributed RC line according to embodiments of this invention. Metal pad 300 can be square and of sufficient size to provide good spatial resolution for determining the position of a touching finger overlaying an array of closely spaced metal pads, but shapes other than squares also be used. Metal pad 300 can be transparent or opaque. TFT 302 can be a low mobility device such as an organic transistor.

Figure 4:
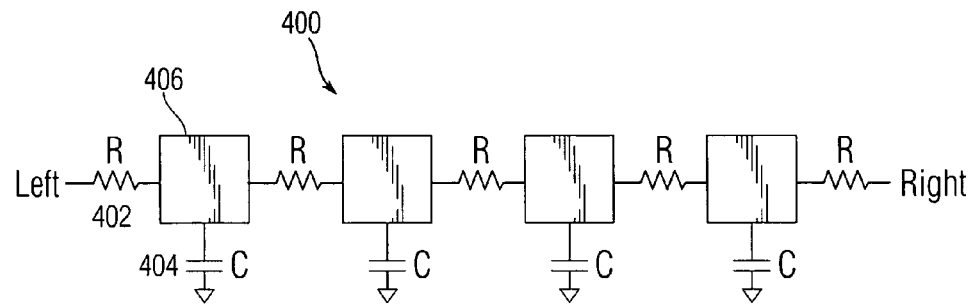
FIG. 4 illustrates an exemplary distributed RC line constructed from discrete resistors, capacitors, and metal pads that can represent one row of multi-touch sensors according to one embodiment of this invention.

FIG. 4 illustrates an exemplary distributed RC line 400 constructed from discrete resistors 402, capacitors 404, and metal pads 406 that can represent one row of multi-touch sensors. However, because the use of discrete resistors 402 would not enable the construction of a two-dimensional multi-touch sensor array as required for a multi-touch sensor panel, low mobility transistors can be used instead of discrete resistors 402.

Figure 5:
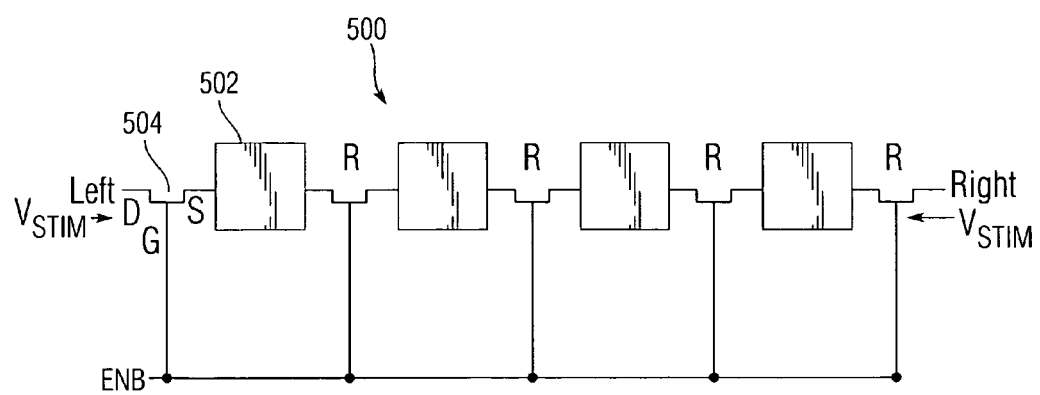
FIG. 5 illustrates an exemplary distributed RC line constructed using metal pads and field effect TFTs according to one embodiment of this invention.

FIG. 5 illustrates an exemplary distributed RC line 500 constructed using metal pads 502 and field effect TFTs 504 according to some embodiments of the invention. In the usual applications where TFTs are employed (e.g., LCDs), they are designed to operate as switches with a low on-state resistance. In other words, when the enable line ENB is asserted, TFTs 504 conduct and metal pads 502 are essentially connected to each other, and when ENB is de-asserted, the TFTs are not conducting and the metal pads are essentially isolated from each other. However, TFTs 504 utilized with embodiments of this invention may have a high on-state resistance and act as resistors. The TFTs also provide an intrinsic capacitance.

Note that organic TFTs (used in display devices and plastic rollable/foldable products) typically have very low mobility μ (i.e., high on-state resistance) compared to silicon-based TFTs, and are therefore usually considered "poor" transistors. However, low mobility is a preferred characteristic for embodiments of this invention. Because organic TFTs have low mobility and are easy to manufacture (they can be printed, painted or rolled on surfaces without stringent clean room requirements), the TFTs used with some embodiments of this invention can be organic TFTs. However, in other embodiments, silicon-based TFTs or other transistors fabricated with sufficiently low mobility can also be used.

As shown in FIG. 5, the gate terminals G of TFTs 504 are connected together and driven by ENB. TFTs 504 turn on when a DC voltage is applied to ENB. A voltage pulse Vstim entering either the right or left side of the row causes TFTs 504 to conduct. As each TFT 504 transitions from an off-state to an on-state it passes through a saturation region where it has very high resistance. As each TFT 504 enters a linear region its resistance decreases and can be approximated using the Shockley model, which expresses the drain current as $$I_d = (\mu CW/L)(V_{gs}-V_{th})V_{ds}-(\tfrac{1}{2})V_{ds}^2,$$

where $\mu$ is the mobility, C is the gate unit capacitance, W is the transistor width, L is the transistor length, $V_{gs}$ is the gate source voltage, $V_{th}$ is the threshold voltage, and $V_{ds}$ is the drain source voltage. Because there is only a capacitive load along the distributed RC line, $V_{ds}$ can be assumed to be small. Therefore, the effective resistance can be written as $$R_{\mathit{eff}} = \frac{L}{(\mu CW)(V_{gs}-V_{th})}.$$

When ENB is asserted, TFTs 504 are in their on state and present a high resistance R between metal pads 502. Each metal pad 502 is capacitively coupled to the AC ground provided by the ENB voltage source through the TFT's source-gate capacitance. The capacitance C can also be made up of stray components to other grounds. The magnitude of C should preferably be less than the capacitance introduced by a touching finger in order for distributed RC line 500 to have sufficient resolution to be an effective touch sensor. The large TFT resistance R coupled with a small pad capacitance C produces a sufficiently large pulse travel time that can be measured with a low-cost microcontroller.

As mentioned above, the pulse travel time depends on the product RC. A finger touching or in close proximity to distributed RC line 500 alters the product RC and thus its presence will increase the pulse travel time. However, because distributed RC line 500 has a distributed resistance and capacitance, the pulse travel time will also depend on where the finger is located along the distributed RC line. For example, a finger touching near one end of distributed RC line 500 will result in a different pulse travel time than the same finger touching the center of the distributed RC line. For multi-touch sensing according to embodiments of this invention, this effect should be equalized so that no matter where the finger is located along distributed RC line 500, the pulse travel time will be approximately the same. In order to equalize this spatial dependency, two measurements can be taken. For the first measurement, a Vstim pulse is injected into the right side of the line and the pulse travel time is recorded. For the second measurement, a Vstim pulse is injected into the left side and the travel time is once again recorded. Summing the two measurements equalizes the spatial dependency.

Figure 6:
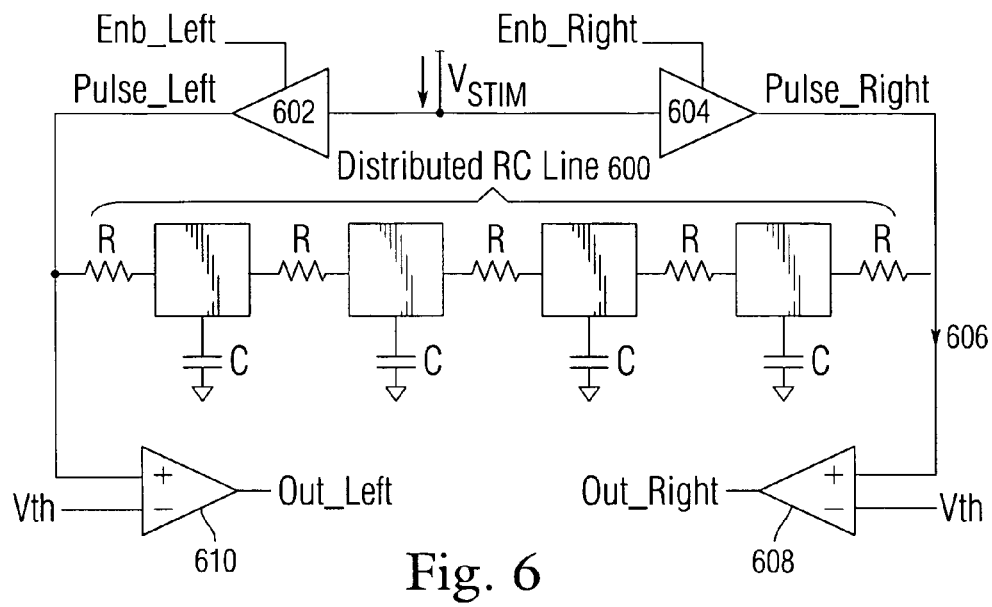
FIG. 6 illustrates an exemplary circuit capable of measuring pulse travel times to allow for equalization of the spatial dependency of the pulse travel times according to one embodiment of this invention.

FIG. 6 illustrates an exemplary circuit capable of measuring pulse travel times to allow for equalization of the spatial dependency of the pulse travel times according to embodiments of this invention. FIG. 6 includes distributed RC line 600 with the TFTs symbolically replaced with resistors R and capacitors C. In FIG. 6, left side driver 602 is enabled while right side driver 604 is disabled. The enabled left-side driver 602 injects a pulse Vstim into the left side of distributed RC line 600, and the time at which the pulse was injected is recorded. When the amplitude of the exiting pulse 606 on the right side reaches a threshold voltage Vth, the right side voltage comparator 608 changes state. The arrival time of the pulse as indicated by the comparator's state change can be recorded by a conventional digital timer circuit (not shown). Note that in other embodiments, circuits other than comparators can be used to detect the arrival of the pulse. The difference between the pulse injection time and the arrival time is the pulse travel time going left to right. This process is repeated but with right side driver 604 now enabled and left side driver 602 disabled, which produces a pulse exiting from comparator 610 and a pulse travel time going right to left. The sum of these two measurements is the equalized pulse travel time.

Figure 7:
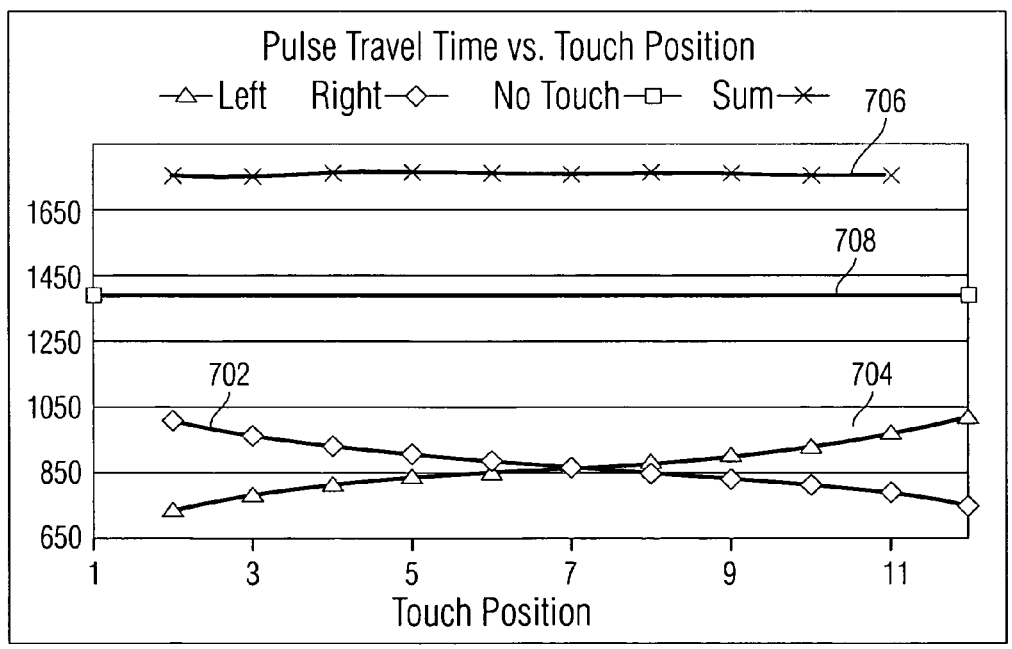
FIG. 7 is a plot of exemplary pulse travel times for a finger touching a distributed RC line at various points along the line according to one embodiment of this invention.

FIG. 7 is a plot of exemplary pulse travel times for a finger touching a distributed RC line at various points along the line according to embodiments of the invention. Trace 704 represents pulse travel times for the pulse going left to right while trace 702 is for the pulse going right to left. Note that the pulse travel time changes significantly as a function of finger position, and thus the location of a finger touching a single sensor can be determined from comparing the left-to-right and right-to-left pulse travel times. The equalized travel time is shown as trace 706, which is substantially independent of finger position. Its profile (general shape) is also independent of the actual capacitance added by the finger. Therefore, if two or more fingers were touching the distributed RC line, the magnitude of the travel times would change (increase) but the profile would remain relatively flat. Trace 708 represents the equalized travel time for the case when no finger is touching the distributed RC line. Therefore, any measured pulse travel times in excess of trace 708 indicates that one or more fingers are touching the distributed RC line.

Figure 8:
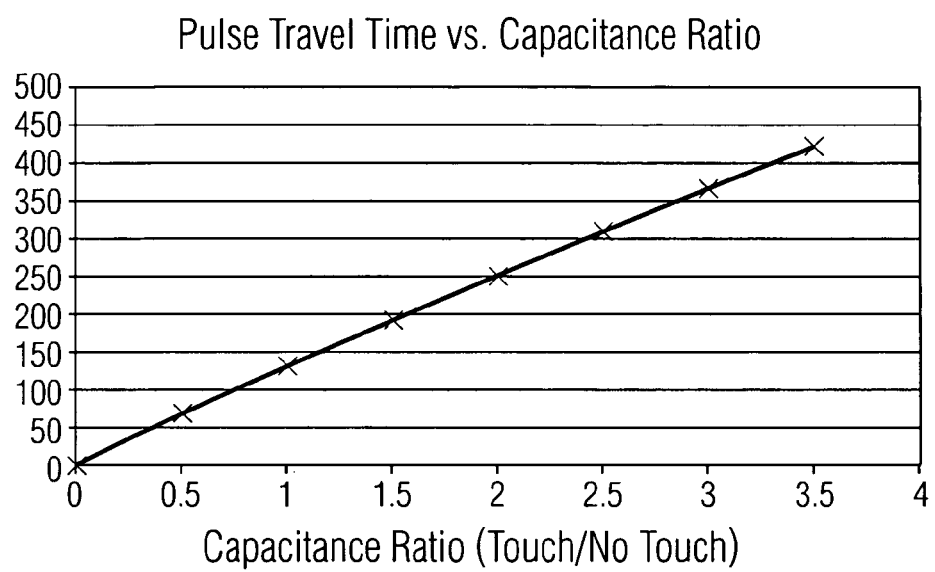
FIG. 8 is an exemplary plot showing the sensitivity of the pulse travel time as a function of the ratio of finger capacitance to the compartmental (background) capacitance, $C_i$, of the distributed RC line according to one embodiment of this invention.

FIG. 8 is an exemplary plot showing the sensitivity of the pulse travel time as a function of the ratio of finger capacitance to the compartmental (background) capacitance, $C_i$, of the distributed RC line. The plot shows that the difference in travel times for the touched versus the untouched cases depends on the ratio of finger capacitance to compartmental (baseline) capacitance. Larger capacitance ratios provide better differentiation between the touched and the untouched cases. If the ratio becomes too small then the temporal resolution of the pulse travel time measurement will have to increase.

Figure 9:
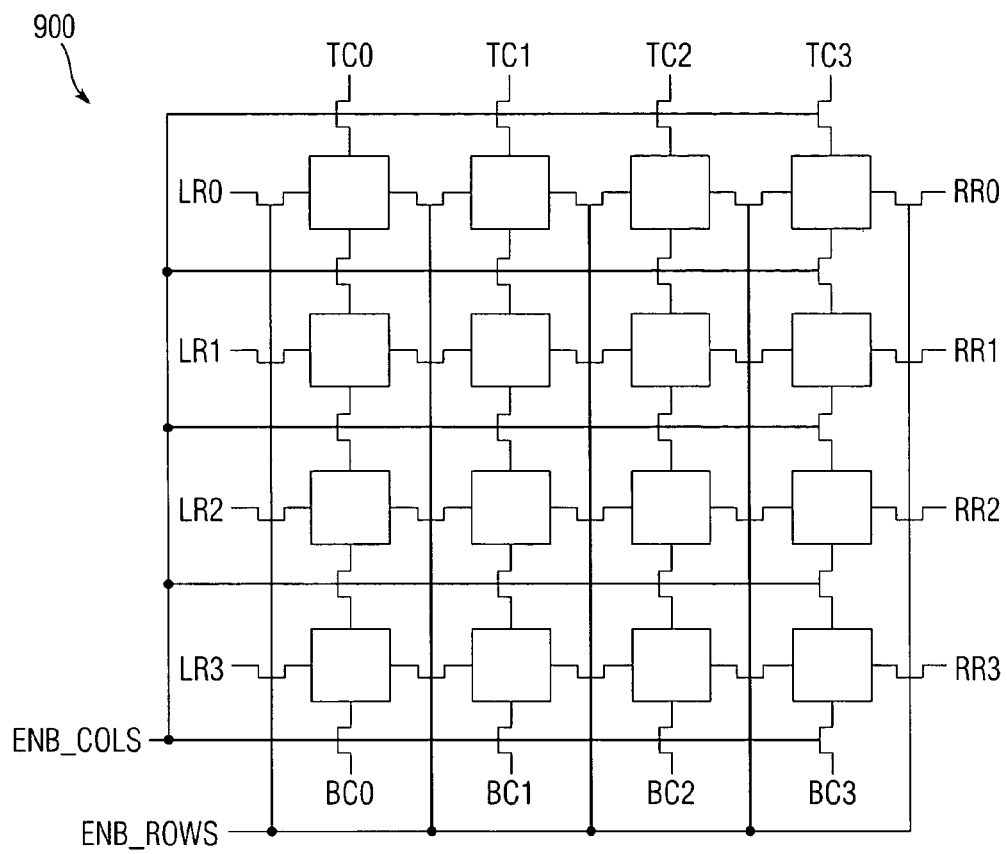
FIG. 9 illustrates an exemplary four row and four column multi-touch sensor panel constructed with an array of one-dimensional distributed RC lines according to one embodiment of this invention.

FIG. 9 illustrates an exemplary four row and four column multi-touch sensor panel 900 constructed with an array of one-dimensional distributed RC lines according to embodiments of this invention. During operation, the rows and columns are enabled at different times, and the left-to-right and right-to-left pulse travel times and equalized travel times for each row and column are measured or computed. For example, to measure the row left-to-right pulse travel times, the left side terminals (LR0-3) can be connected to one or more pulse drivers while the right side terminals (RR0-3) can be connected to individual time capture circuits through individual comparators. The ENB_ROWS signal can be asserted and the ENB_COLS signal is negated. A pulse is the injected into each left side terminal and the pulse travel time for each row is recorded. Note that these row travel time measurements may be performed simultaneously for two or more rows. This process can then be repeated to capture right-to-left pulse travel times. When the equalized pulse travel times for the rows have been computed, they can be compared to the equalized no-touch travel time to determine which rows, if any, have a finger touching it.

The above-described process can be repeated for the columns. The ENB_COLS signal can be asserted and the ENB_ROWS signal is negated. Pulses are injected into the top terminals (TC0-3) (in some embodiments a single pulse for each column), and the pulse travel times for top to bottom pulse injection are recorded. This is repeated for bottom to top pulse injection. The resulting equalized pulse travel times for the array of columns provides an indication as to which columns have a finger touching it. The combined row and column data is a map, albeit an ambiguous one, of all points touched by fingers. However, before an unambiguous map of finger contacts can be generated, more information needs to be applied.

Using just the equalized pulse travel times does not allow for an unambiguous construction of a map of finger contacts. The reason for this is that the equalized pulse travel times, which provide high selectivity in determining whether a finger(s) is touching over a row or a column, only provide projection scan-like data that, by itself, cannot resolve rotational ambiguities of multiple finger contacts. However, once the rows and columns containing finger contacts are known, the un-equalized left-to-right, right-to-left, top-to-bottom and bottom-to-top pulse travel time data can be used to determine the relative positions of the fingers within the rows and columns and un-ambiguously determine the positions of all the finger contacts.

It should be understood that although the single-surface multi-touch sensor panel shown in FIG. 9 is formed in rows and columns perpendicular to each other, in other embodiments other non-orthogonal orientations are possible. For example, in a polar coordinate system, the "rows" can be concentric circles and the "columns" can be radially extending lines (or vice versa). It should be understood, therefore, that the terms "row" and "column," "first dimension" and "second dimension," or "first axis" and "second axis" as may be used herein are intended to encompass not only orthogonal grids, but the intersecting traces of other geometric configurations having first and second dimensions (e.g. the concentric and radial lines of a polar-coordinate arrangement).

Figure 10:
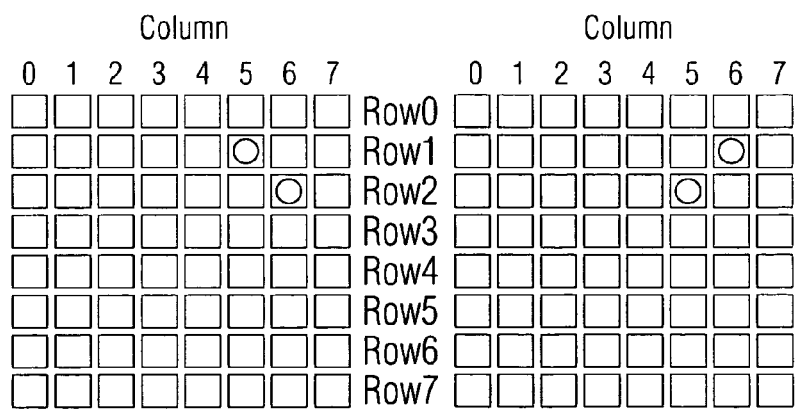
FIG. 10 illustrates two exemplary cases where the projection scan-like data requires disambiguation according to one embodiment of the invention.

As mentioned above, the pulse travel time depends on the position of the finger along the distributed RC line. Therefore, the four measurements of pulse travel times for each row and for each column can be compared to each other to resolve rotational ambiguities. For example, FIG. 10 illustrates two exemplary cases where the projection scan-like data requires disambiguation according to embodiments of the invention. In the exemplary 8×8 array of FIG. 10, two finger contacts are shown. In the array on the left, the fingers are located at (1, 5) and (2, 6). In the array on the right the fingers are located at (2, 5) and (1, 6).

The equalized pulse travel time data for both cases shown in FIG. 10 is basically identical. Therefore, the equalized pulse travel time data alone is not sufficient to distinguish the touching pattern shown on the left frame from the touching pattern shown on the right. In other words, the equalized pulse travel time data can be used to determine that contacts were detected in rows 1 and 2 and columns 5 and 6, but either contact pattern in FIG. 10 could have caused that result. For example, suppose in FIG. 10 that the actual touching pattern is identical to that shown in the left frame of FIG. 10. Nevertheless, the equalized pulse travel times suggest that there are four possible contacts as shown in the following table. These possible contacts represent the initial contact map, which is made up of real and non-existent contacts.

| Possible contacts | (1, 5) | (1, 6) | (2, 6) | (2, 5) |
|---|---|---|---|---|
| Actual contacts | (1, 5) | | (2, 6) | |

Figure 11:
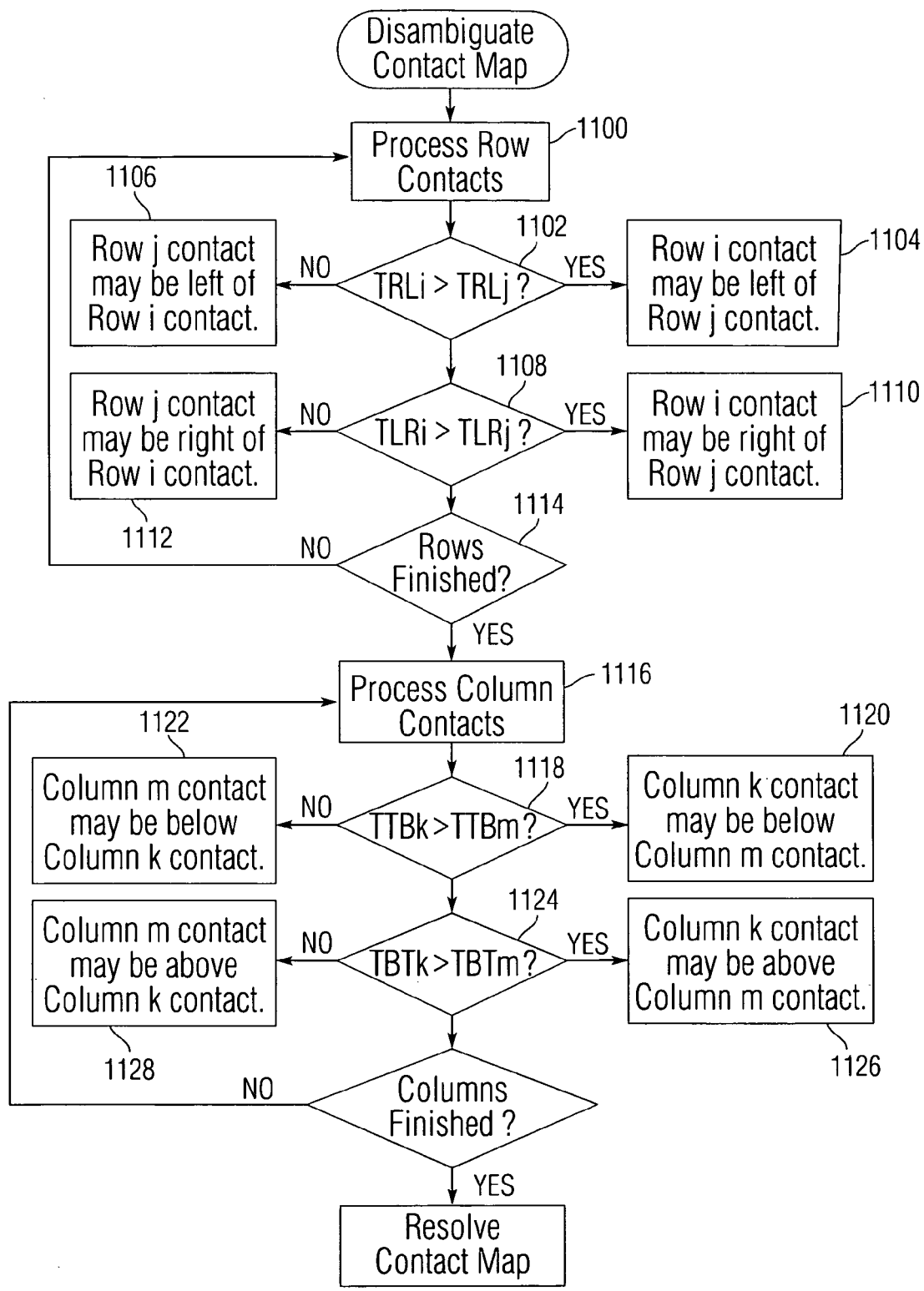
FIG. 11 is a flowchart of a process for disambiguating the initial contact map according to one embodiment of this invention.

In embodiments of the invention, the raw pulse travel time data can be used to eliminate the nonexistent contacts. FIG. 11 is a flowchart of a process for disambiguating the initial contact map according to embodiments of this invention. Step 1100 indicates the start of the processing of the rows in the sensor panel. For each row indicating a possible contact, the pulse travel times for right-to-left and left-to-right are compared against other rows for which there were possible contacts, one by one, to establish the relative positions of the contacts across the rows. Thus, in step 1102, the right-to-left pulse travel time for row "i" is compared to the right-to-left pulse travel time for row "j". If the right-to-left pulse travel time for row "i" is larger than the right-to-left pulse travel time for row "j", then it is possible that the row "i" contact is left of the row "j" contact (see step 1104). If not, then it is possible that the row "j" contact is left of the row "i" contact (see step 1106). Next, in step 1108, the left-to-right pulse travel time for row "i" is compared to the left-to-right pulse travel time for row "j". If the left-to-right pulse travel time for row "i" is larger than the left-to-right pulse travel time for row "j", then it is possible that the row "i" contact is right of the row "j" contact (see step 1110). If not, then it is possible that the row "j" contact is left of the row "i" contact (see step 1112). The results of steps 1102 and 1108 can be interpreted as shown in the table below.

|  | Step 1108-Yes | Step 1108-No |
|---|---|---|
| Step 1102-Yes | Undefined | Contact in row "i" in a column to the left of contact in "row j" |
| Step 1102-No | Contact in row "i" in a column to the right of contact in row "i" | Contact in row "i" in same column as contact in row "j" |

After all rows have been processed (see step 1114), the same process is then repeated for each column showing a possible contact (see step 1116). For each column indicating a possible contact, the pulse travel times for top-to-bottom and bottom-to-top are compared against other columns for which there were possible contacts, one by one, to establish the relative positions of the contacts across the columns. Thus, in step 1118, the top-to-bottom pulse travel time for column "k" is compared to the top-to-bottom pulse travel time for column "m". If the top-to-bottom pulse travel time for column "k" is larger than the top-to-bottom pulse travel time for column "m", then it is possible that the column "k" contact is below the column "m" contact (see step 1120). If not, then it is possible that the column "m" contact is below the column "k" contact (see step 1122). Next, in step 1124, the bottom-to-top pulse travel time for column "k" is compared to the bottom-to-top pulse travel time for column "m". If the bottom-to-top pulse travel time for column "k" is larger than the bottom-to-top pulse travel time for column "m", then it is possible that the column "k" contact is above the column "m" contact (see step 1126). If not, then it is possible that the column "m" contact is above the column "k" contact (see step 1128). The results of steps 1118 and 1124 can be interpreted as shown in the table below.

|  | Step 1124-Yes | Step 1124-No |
| --- | --- | --- |
| Step 1118-Yes | Undefined | Contact in column "k" in a row below contact in "column "m" |
| Step 1118-No | Contact in column "k" in a row above contact in column "m" | Contact in column "k" in same row as contact in column "m" |

Thus, after disambiguating all rows and columns using the algorithm defined in FIG. 11, the actual contact locations can be determined.

Figure 12:
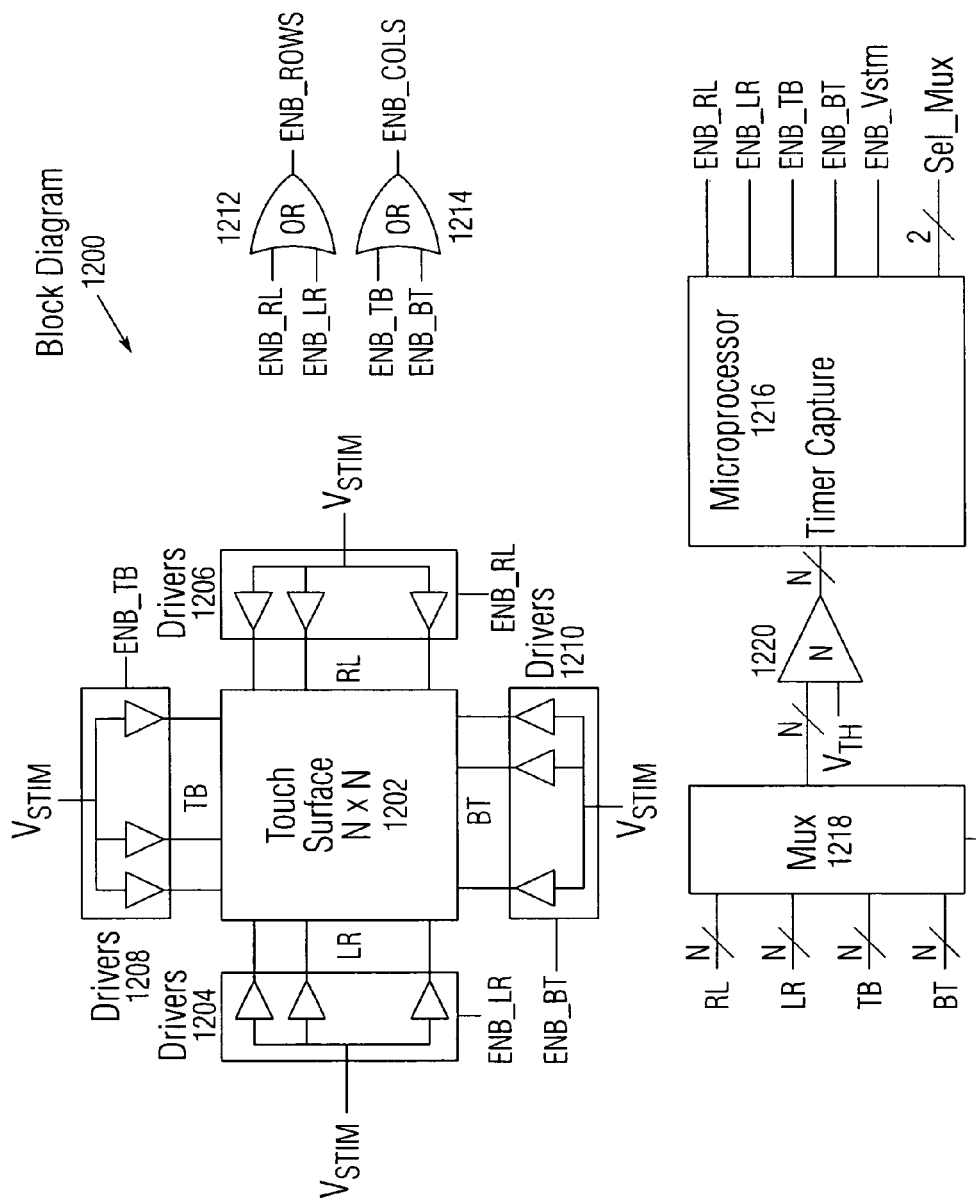
FIG. 12 illustrates an exemplary block diagram of a projection scan multi-touch sensor panel and related components according to one embodiment of this invention.

FIG. 12 illustrates an exemplary block diagram 1200 of projection scan multi-touch sensor panel 1202 and associated components according to one embodiment of this invention. Panel 1202 can be driven with Vstim through left-to-right drivers 1204 selectable by an ENB_LR enable signal, right-to-left drivers 1206 selectable by an ENB_RL enable signal, top-to-bottom drivers 1208 selectable by an ENB_TB enable signal, and bottom-to-top drivers 1210 selectable by an ENB_BT enable signal. The enable rows signal ENB_ROWS can be generated by gating ENB_RL and ENB_LR through OR gate 1212, while the enable columns signal ENB_COLS can be generated by gating ENB_TB and ENB_BT through OR gate 1214. Microprocessor 1216 can generate ENB_RL, ENB_LR, ENB_TB, ENB_BT, Vstim, and a multiplex select signal Sel_Mux. When the rows or columns are enabled and a pulse on Vstim is sent through panel 1202, multiplexer 1218 selects one group of outputs (RL, LR, TB and BT) from panel 1202 in accordance with Sel_Mux, detects the pulse using comparator 1220 and threshold Vth, where it is captured back in microprocessor 1216, which can then compute the total delay time for that pulse.

Microprocessor 1216 can also be communicatively coupled to a host processor (not shown) for performing actions based on the outputs of panel 1202 that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor can also perform additional functions that may not be related to panel processing, and can be coupled to program storage and a display device such as a liquid crystal display (LCD) for providing a UI to a user of the device.

Figure 13A:
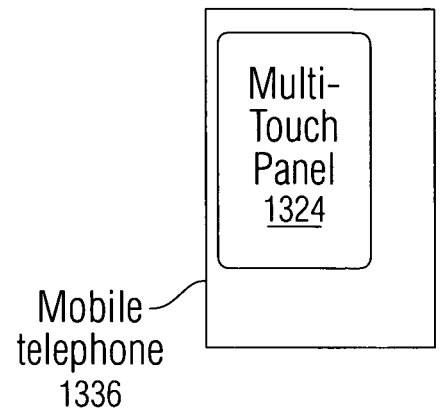
FIG. 13*a* illustrates an exemplary mobile telephone that can include a single-surface multi-touch sensor panel according to one embodiment of this invention.
Figure 13B:
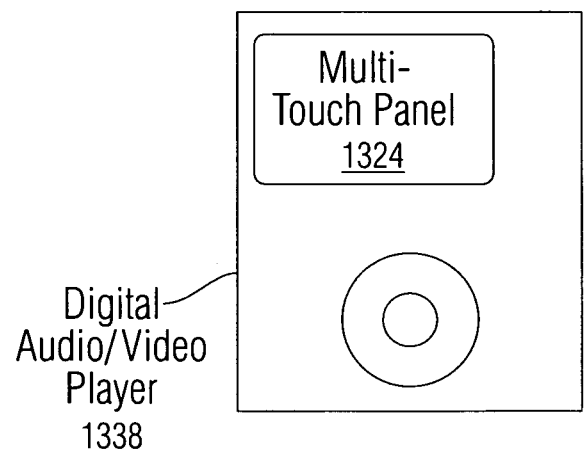
FIG. 13*b* illustrates an exemplary digital audio/video player that can include a single-surface multi-touch sensor panel according to one embodiment of this invention.

FIG. 13a illustrates an exemplary mobile telephone 1336 that can include single-surface multi-touch sensor panel 1324 according to embodiments of this invention. FIG. 13b illustrates an exemplary digital audio/video player 1338 that can include single-surface multi-touch sensor panel 1324 according to embodiments of this invention. The mobile telephone and digital audio/video player of FIGS. 13a and 13b can advantageously benefit from single-surface multi-touch sensor panel 1324 because only a single surface of circuitry is needed to realize a multi-touch sensor, reducing manufacturing costs and making the sensor panel very thin and flexible. Manufacturing costs may be reduced because no assembly steps are needed on the second side of the substrate, and because the components on the first side can be applied using low cost processes such as printing or rolling. Furthermore, the TFTs can be formed using inexpensive low mobility organic TFTs. The single-surface multi-touch sensor panel is also lower in power consumption, and its projection scanning principles results in fast frame rates, a reduction in the memory needed to hold surface data, and simpler data processing.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A single-surface touch sensor panel, comprising:
   a plurality of distributed resistor-capacitor (RC) lines arranged in an array of rows and columns, the distributed RC lines including alternating connected transistors and metal pads formed on a single surface of a sensor panel substrate, each transistor having drain and source terminals connected to adjacent metal pads;
   a column enable line connected to a gate terminal of every transistor in the distributed RC lines oriented in a column; and
   a row enable line connected to a gate terminal of every transistor in the distributed RC lines oriented in a row.

2. The single-surface touch sensor panel of claim 1, further comprising:
   one or more drivers couplable to both ends of every distributed RC line for driving a pulse through the distributed RC line in different directions;
   one or more comparators couplable to both ends of every distributed RC line for receiving the pulse from the distributed RC line; and
   pulse travel time measurement logic configured for measuring a travel time of each pulse as it passes through the distributed RC line.

3. The single-surface touch sensor panel of claim 1, the transistors comprising thin-film transistors (TFTs).

4. The single-surface touch sensor panel of claim 1, the transistors comprising organic thin-film transistors (TFTs).

5. A single-surface touch-sensitive distributed resistor-capacitor (RC) array, comprising:
   alternating connected transistors and metal pads, each transistor having drain and source terminals connected to adjacent metal pads, the metal pads electrically coupled between the drain and source terminals of adjacent transistors, the transistors and metal pads formed in rows and columns on a single surface of a substrate; and
   a row enable line connected to a gate terminal of every transistor in the rows, and a column enable line connected to the gate terminal of every transistor in the columns.

6. The single-surface touch-sensitive distributed RC line of claim 5, further comprising:
   one or more drivers couplable to both ends of the distributed RC line for driving a pulse through the distributed RC line in different directions;
   one or more comparators couplable to both ends of the distributed RC line for receiving the pulse from the distributed RC line; and pulse travel time measurement logic configured for measuring a travel time of each pulse as it passes through the distributed RC line.

7. The single-surface touch-sensitive distributed RC line of claim 5, the transistors comprising thin-film transistors (TFTs).

8. The single-surface touch-sensitive distributed RC line of claim 5, the transistors comprising organic thin-film transistors (TFTs).

9. A method for forming a single-surface touch sensor panel, comprising:
forming each of a plurality of distributed resistor-capacitor (RC) lines by alternating connected transistors and metal pads on a single surface of a sensor panel substrate, each transistor having drain and source terminals connected to adjacent metal pads;
arranging the plurality of distributed RC lines in an array of rows and columns;
connecting a column enable line to a gate terminal of every transistor in the distributed RC lines oriented in a column; and
connecting a row enable line to a gate terminal of every transistor in the distributed RC lines oriented in a row.

10. The method of claim 9, the distributed RC lines formed on the single surface of the sensor panel substrate by printing techniques.

11. The method of claim 9, the transistors comprising thin-film transistors (TFTs).

12. The method of claim 9, the transistors comprising organic thin-film transistors (TFTs).

13. A method for forming a single-surface touch-sensitive distributed resistor-capacitor (RC) array, comprising:
alternating connected transistors and metal pads in rows and columns on a single surface of a substrate, each transistor having drain and source terminals connected to adjacent metal pads, wherein the metal pads are electrically coupled between the drain and source terminals of adjacent transistors; and
connecting a row enable line to a gate terminal of every transistor in the rows, and connecting a column enable line to the gate terminal of every transistor in the columns.

14. The method of claim 13, the transistors and metal pads formed on the single surface of the substrate by printing techniques.

15. The method of claim 13, the transistors comprising thin-film transistors (TFTs).

16. The method of claim 13, the transistors comprising organic thin-film transistors (TFTs).

17. A method for detecting one or more touches on a single-surface touch sensor panel having columns and rows of distributed resistor-capacitor (RC) lines formed from alternating transistors and metal pads on a single surface of a sensor panel substrate, comprising:
for every row, enabling the transistors in that row while disabling the transistors in all columns, sending a pulse left-to-right and then right-to-left through the row, measuring left-to-right and right-to-left pulse travel times through the row, and computing an equalized pulse travel time for that row as the sum of the left-to-right and right-to-left travel times;
for every column, enabling the transistors in that column while disabling the transistors in all rows, sending a pulse top-to-bottom and then bottom-to-top through the column, measuring top-to-bottom and bottom-to-top pulse travel times through the column, and computing an equalized pulse travel time for that column as the sum of the top-to-bottom and bottom-to-top travel times; and
identifying the rows and columns having touches as those rows and columns having equalized pulse travel times greater than a no-touch equalized pulse travel time.

18. The method of claim 17, wherein enabling transistors comprises turning on the transistors by applying a first potential at a gate terminal of the transistors, and disabling transistors comprises turning off the transistors by applying a second potential at the gate terminal of the transistors.

19. The method of claim 17, wherein sending a pulse through the rows and columns comprises connecting drivers to the rows and columns and generating a pulse from the connected drivers, and connecting comparators to the rows and columns and detecting pulses received from the rows and columns at the connected comparators.

20. The method of claim 19, wherein measuring pulse travel times comprises recording a first time when a pulse is generated by a driver and a second time when that pulse is detected by the comparator, and computing a difference between the first and second times.

21. The method of claim 17, further comprising disambiguating touch locations by:
for any two rows "i" and "j" at which a touch was detected,
making a first comparison as to whether the right-to-left pulse travel time for row "i" is greater than the right-to-left pulse travel time for row "j",
making a second comparison as to whether the left-to-right pulse travel time for row "i" is greater than the left-to-right pulse travel time for row "j",
determining that the touch at row "i" is in a column to a left of the touch at row "j" if the first comparison is true and the second comparison is false,
determining that the touch at row "i" is in a column to a right of the touch at row "j" if the first comparison is false and the second comparison is true, and
determining that the touch at row "i" is in the same column as the touch at row "j" if the first and second comparisons are false; and
for any two columns "k" and "m" at which a touch was detected,
making a third comparison as to whether the top-to-bottom pulse travel time for column "k" is greater than the top-to-bottom pulse travel time for column "m",
making a fourth comparison as to whether the bottom-to-top pulse travel time for column "k" is greater than the bottom-to-top pulse travel time for column "m",
determining that the touch at column "k" is in a row below the touch at column "m" if the third comparison is true and the fourth comparison is false,
determining that the touch at column "k" is in a row above the touch at column "m" if the third comparison is false and the fourth comparison is true, and
determining that the touch at column "k" is in the same row as the touch at column "m" if the third and fourth comparisons are false.

22. A method for detecting one or more touches on a single-surface touch-sensitive distributed resistor-capacitor (RC) line formed from alternating transistors and metal pads on a single surface of a substrate, comprising:
enabling the transistors in the distributed RC line, sending a pulse left-to-right and then right-to-left through the distributed RC line, and measuring left-to-right and right-to-left pulse travel times through the distributed RC line; and computing a difference between the left-to-right and right-to-left travel times to determine the location of a single touch on the distributed RC line.

23. A system for detecting one or more touches on a single-surface touch sensor panel having columns and rows of distributed resistor-capacitor (RC) lines formed from alternating transistors and metal pads on a single surface of a sensor panel substrate, the system including a processor programmed for causing performance of a method comprising:
for every row, enabling the transistors in that row while disabling the transistors in all columns, sending a pulse left-to-right and then right-to-left through the row, measuring left-to-right and right-to-left pulse travel times through the row, and computing an equalized pulse travel time for that row as the sum of the left-to-right and right-to-left travel times;
for every column, enabling the transistors in that column while disabling the transistors in all rows, sending a pulse top-to-bottom and then bottom-to-top through the column, measuring top-to-bottom and bottom-to-top pulse travel times through the column, and computing an equalized pulse travel time for that column as the sum of the top-to-bottom and bottom-to-top travel times; and
identifying the rows and columns having touches as those rows and columns having equalized pulse travel times greater than a no-touch equalized pulse travel time.

24. The system of claim 23, wherein enabling transistors comprises turning on the transistors by applying a first potential at a gate terminal of the transistors, and disabling transistors comprises turning off the transistors by applying a second potential at the gate terminal of the transistors.

25. The system of claim 23, wherein sending a pulse through the rows and columns comprises connecting drivers to the rows and columns and generating a pulse from the connected drivers, and connecting comparators to the rows and columns and detecting pulses received from the rows and columns at the connected comparators.

26. The system of claim 25, wherein measuring pulse travel times comprises recording a first time when a pulse is generated by a driver and a second time when that pulse is detected by the comparator, and computing a difference between the first and second times.

27. The system of claim 23, the method further comprising disambiguating touch locations by:
for any two rows "i" and "j" at which a touch was detected,
making a first comparison as to whether the right-to-left pulse travel time for row "i" is greater than the right-to-left pulse travel time for row "j",
making a second comparison as to whether the left-to-right pulse travel time for row "i" is greater than the left-to-right pulse travel time for row "j",
determining that the touch at row "i" is in a column to a left of the touch at row "j" if the first comparison is true and the second comparison is false,
determining that the touch at row "i" is in a column to a right of the touch at row "j" if the first comparison is false and the second comparison is true, and
determining that the touch at row "i" is in the same column as the touch at row "j" if the first and second comparisons are false; and
for any two columns "k" and "m" at which a touch was detected,
making a third comparison as to whether the top-to-bottom pulse travel time for column "k" is greater than the top-to-bottom pulse travel time for column "m",
making a fourth comparison as to whether the bottom-to-top pulse travel time for column "k" is greater than the bottom-to-top pulse travel time for column "m",
determining that the touch at column "k" is in a row below the touch at column "m" if the third comparison is true and the fourth comparison is false,
determining that the touch at column "k" is in a row above the touch at column "m" if the third comparison is false and the fourth comparison is true, and
determining that the touch at column "k" is in the same row as the touch at column "m" if the third and fourth comparisons are false.

28. A system for detecting one or more touches on a single-surface touch-sensitive distributed resistor-capacitor (RC) line formed from alternating transistors and metal pads on a single surface of a substrate, the system including a processor programmed for causing performance of a method comprising:
enabling the transistors in the distributed RC line, sending a pulse left-to-right and then right-to-left through the distributed RC line, and measuring left-to-right and right-to-left pulse travel times through the distributed RC line; and
computing a difference between the left-to-right and right-to-left travel times to determine the location of a single touch on the distributed RC line.

29. An apparatus for detecting one or more touches on a single-surface touch sensor panel having columns and rows of distributed resistor-capacitor (RC) lines formed from alternating transistors and metal pads on a single surface of a sensor panel substrate, comprising:
means for enabling the transistors in every row while disabling the transistors in all columns, means for sending a pulse left-to-right and then right-to-left through each row, means for measuring left-to-right and right-to-left pulse travel times through each row, and means for computing an equalized pulse travel time for each row as the sum of the left-to-right and right-to-left travel times for each row;
means for enabling the transistors in every column while disabling the transistors in all rows, means for sending a pulse top-to-bottom and then bottom-to-top through each column, means for measuring top-to-bottom and bottom-to-top pulse travel times through each column, and means for computing an equalized pulse travel time for each column as the sum of the top-to-bottom and bottom-to-top travel times for each column; and
means for identifying the rows and columns having touches as those rows and columns having equalized pulse travel times greater than a no-touch equalized pulse travel time.

30. An apparatus for detecting one or more touches on a single-surface touch-sensitive distributed resistor-capacitor (RC) line formed from alternating transistors and metal pads on a single surface of a substrate, comprising:
means for enabling the transistors in the distributed RC line, means for sending a pulse left-to-right and then right-to-left through the distributed RC line, and means for measuring left-to-right and right-to-left pulse travel times through the distributed RC line; and
means for computing a difference between the left-to-right and right-to-left travel times to determine the location of a single touch on the distributed RC line.

31. A mobile telephone including a single-surface touch sensor panel, the single-surface touch sensor panel comprising:

a plurality of distributed resistor-capacitor (RC) lines arranged in an array of rows and columns, the distributed RC lines including alternating connected transistors and metal pads formed on a single surface of a sensor panel substrate, each transistor having drain and source terminals connected to adjacent metal pads;

a column enable line connected to a gate terminal of every transistor in the distributed RC lines oriented in a column; and a row enable line connected to a gate terminal of every transistor in the distributed RC lines oriented in a row.

32. A digital audio player including a single-surface touch sensor panel, the single-surface touch sensor panel comprising:

a plurality of distributed resistor-capacitor (RC) lines arranged in an array of rows and columns, the distributed RC lines including alternating connected transistors and metal pads formed on a single surface of a sensor panel substrate, each transistor having drain and source terminals connected to adjacent metal pads;

a column enable line connected to a gate terminal of every transistor in the distributed RC lines oriented in a column; and a row enable line connected to a gate terminal of every transistor in the distributed RC lines oriented in a row.

* * * * *